(12) United States Patent
Arruza (10) Patent No.: US 7,650,367 B2
(45) Date of Patent: Jan. 19, 2010

(54) METHODS, SYSTEMS, AND COMPUTER PROGRAM PRODUCTS FOR DETECTING AND RESTORING MISSING OR CORRUPTED DATA IN A DISTRIBUTED, SCALABLE, REDUNDANT MEASUREMENT PLATFORM DATABASE

(75) Inventor: Dwayne Arruza, Apex, NC (US)

(73) Assignee: Tekelec, Morrisville, NC (US)

( * ) Notice: Subject to any disclaimer, the term of this patent is extended or adjusted under 35 U.S.C. 154(b) by 206 days.

(21) Appl. No.: 11/341,135

(22) Filed: Jan. 27, 2006

(65) Prior Publication Data

US 2007/0179993 A1 Aug. 2, 2007

Related U.S. Application Data

(60) Provisional application No. 60/758,623, filed on Jan. 13, 2006.

(51) Int. Cl.
*G06F 11/00* (2006.01)
(52) U.S. Cl. ...................................... 707/202
(58) Field of Classification Search .................. 707/202
See application file for complete search history.

(56) References Cited

U.S. PATENT DOCUMENTS

| | | | |
|---|---|---|---|
| 5,056,086 A | | 10/1991 | Libonati |
| 5,579,318 A | * | 11/1996 | Reuss et al. .................. 370/410 |
| 5,610,915 A | | 3/1997 | Elliott et al. |
| 5,623,540 A | * | 4/1997 | Morrison et al. ....... 379/112.01 |
| 5,649,089 A | * | 7/1997 | Kilner ............................. 714/6 |
| 5,684,990 A | * | 11/1997 | Boothby ..................... 707/203 |
| 5,687,363 A | * | 11/1997 | Oulid-Aissa et al. ........... 707/4 |
| 5,825,769 A | | 10/1998 | O'Reilly et al. |
| 5,835,757 A | * | 11/1998 | Oulid-Aissa et al. .......... 707/10 |
| 5,854,834 A | | 12/1998 | Gottlieb et al. |
| 5,854,835 A | | 12/1998 | Montgomery et al. |
| 5,867,558 A | | 2/1999 | Swanson |

(Continued)

FOREIGN PATENT DOCUMENTS

WO    WO 02/49282 A2    6/2002

OTHER PUBLICATIONS

T. Klingberg, et al., "Gnutella 0.6". Gnutella, Jun. 2002, http://rfc-gnutella.sourceforge.net/src/rfc-0_6-draft.html.*

(Continued)

*Primary Examiner*—Charles Rones
*Assistant Examiner*—Kurt Mueller
(74) *Attorney, Agent, or Firm*—Jenkins, Wilson, Taylor & Hunt, P.A.

(57) ABSTRACT

Methods, systems, and computer program products for detecting and restoring missing or corrupted data in a distributed, scalable, redundant measurement platform database are disclosed. According to one method, a local database including local database entries is audited to identify suspect local database entries having at least one of missing and corrupted data. The local database is cross-compared with a redundant remote database that is a peer of the local database and that includes redundant remote database entries that are associated with the local database entries to identify local database entries that are inconsistent with the redundant remote database entries. For each local database entry identified as suspect and inconsistent with the corresponding redundant remote database entry, the local database entry is replaced with the redundant remote database entry.

27 Claims, 4 Drawing Sheets

U.S. PATENT DOCUMENTS

| | | | |
|---|---|---|---|
| 5,867,565 | A | 2/1999 | Morikawa |
| 5,884,325 | A * | 3/1999 | Bauer et al. ............... 707/201 |
| 6,002,753 | A * | 12/1999 | Morrison et al. ....... 379/112.01 |
| 6,105,034 | A * | 8/2000 | Buckler ................. 707/103 R |
| 6,108,408 | A | 8/2000 | Plunkett et al. |
| 6,137,869 | A | 10/2000 | Voit et al. |
| 6,195,658 | B1 * | 2/2001 | Comito et al. ................. 707/6 |
| 6,247,135 | B1 * | 6/2001 | Feague ....................... 713/400 |
| 6,263,060 | B1 * | 7/2001 | MeLampy et al. ..... 379/114.15 |
| 6,275,831 | B1 * | 8/2001 | Bodnar et al. ............... 707/201 |
| 6,381,239 | B1 * | 4/2002 | Atkinson et al. ............ 370/362 |
| 6,389,130 | B1 | 5/2002 | Shenoda et al. |
| 6,446,092 | B1 * | 9/2002 | Sutter ......................... 707/203 |
| 6,449,622 | B1 * | 9/2002 | LaRue et al. ................ 707/201 |
| 6,457,007 | B1 * | 9/2002 | Kikuchi et al. ................ 707/10 |
| 6,535,892 | B1 * | 3/2003 | LaRue et al. ................ 707/203 |
| 6,553,388 | B1 * | 4/2003 | Perks .......................... 707/201 |
| 6,560,226 | B1 | 5/2003 | Torrey et al. |
| 6,636,868 | B1 * | 10/2003 | McQuigge Ernst et al. ...... 707/104.1 |
| 6,668,051 | B1 | 12/2003 | Ashdown et al. |
| 6,671,699 | B1 * | 12/2003 | Black et al. ................. 707/201 |
| 6,718,347 | B1 * | 4/2004 | Wilson ........................ 707/201 |
| 6,721,405 | B1 | 4/2004 | Nolting et al. |
| 6,771,951 | B1 * | 8/2004 | Leonetti ................... 455/414.1 |
| 6,889,229 | B1 * | 5/2005 | Wong et al. ................. 707/102 |
| 6,892,210 | B1 * | 5/2005 | Erickson et al. ............ 707/201 |
| 6,967,956 | B1 | 11/2005 | Tinsley et al. |
| 6,968,209 | B1 * | 11/2005 | Ahlgren et al. ............. 455/558 |
| 7,054,422 | B2 | 5/2006 | Delaney et al. |
| 7,085,360 | B1 * | 8/2006 | Sprouse ................. 379/114.04 |
| 7,117,197 | B1 * | 10/2006 | Wong et al. ..................... 707/3 |
| 2001/0014893 | A1 * | 8/2001 | Boothby ...................... 707/201 |
| 2002/0116405 | A1 * | 8/2002 | Bodnar et al. ............... 707/202 |
| 2002/0120771 | A1 | 8/2002 | Delaney et al. |
| 2002/0131401 | A1 | 9/2002 | Ehreth |
| 2002/0143798 | A1 * | 10/2002 | Lisiecki et al. .............. 707/200 |
| 2002/0188624 | A1 * | 12/2002 | Landin ........................ 707/203 |
| 2003/0023759 | A1 * | 1/2003 | Littleton et al. ............. 709/248 |
| 2003/0037020 | A1 * | 2/2003 | Novak et al. .................... 707/1 |
| 2003/0065685 | A1 * | 4/2003 | Belcaid et al. .............. 707/200 |
| 2003/0074403 | A1 * | 4/2003 | Harrow et al. .............. 709/203 |
| 2003/0149750 | A1 * | 8/2003 | Franzenburg ............... 709/220 |
| 2003/0172070 | A1 * | 9/2003 | Sawadsky et al. ............. 707/10 |
| 2003/0233455 | A1 * | 12/2003 | Leber et al. ................. 709/226 |
| 2004/0013112 | A1 * | 1/2004 | Goldberg et al. ............ 370/389 |
| 2004/0233851 | A1 | 11/2004 | Baldwin et al. |
| 2005/0114407 | A1 * | 5/2005 | Goyal ......................... 707/202 |
| 2006/0031475 | A1 * | 2/2006 | Fuller et al. ................. 709/224 |
| 2006/0034267 | A1 | 2/2006 | Torrey et al. |

OTHER PUBLICATIONS

The Gnutella Protocol Specification v0.4 (Document Revision 1.2), Jun. 2001. http://www9.limewire.com/developer/gnutella_protocol_0.4.pdf.*

BitTorrent Protocol Specification v1.0, Oct. 2002, bittorrent.org, www.bittorrent.org/protocol.html.*

BitTorrent Protocol Specification v1.0 (unofficial), Jan. 2, 2005, theroy.org, http://wiki.theory.org/BitTorrentSpecification/.*

Newton's Telecom Dictionary, 19th Edition, CMP Books, 2003.*

"SCCP: SS7 Signaling Connection Control Part," Javvin Technologies, Inc., pp. 1-3 (publication date unknown).

Notice of Allowance and Fee(s) Due for U.S. Appl. No. 10/021,605 (Mar. 22, 2006).

Official Action for U.S. Appl. No. 10/021,605 (Aug. 4, 2005).

Communication Pursuant to Article 96(2) EPC for European Application No. 01 991 206.2 (Oct. 29, 2007).

Notification of Transmittal of International Preliminary Examination Report for International Application No. PCT/US01/48763 (Oct. 22, 2003).

Notification of European Publication Number and Information on the Application of Article 67(3) EPC for European Patent No. 1346584 (Aug. 13, 2003).

Written Opinion for International Application No. PCT/US01/48763 (Feb. 27, 2003).

Notification of Transmittal of the International Search Report or the Declaration for International Application No. PCT/US01/48763 (Jun. 26, 2002).

Jackson et al., "SS7 Network Management Using Link Monitors," IEEE, pp. 883-888 (Jun. 8, 1997).

* cited by examiner

METHODS, SYSTEMS, AND COMPUTER PROGRAM PRODUCTS FOR DETECTING AND RESTORING MISSING OR CORRUPTED DATA IN A DISTRIBUTED, SCALABLE, REDUNDANT MEASUREMENT PLATFORM DATABASE

RELATED APPLICATIONS

This application claims the benefit of a U.S. provisional patent application entitled, "Methods, Systems, and Computer Program Products for Detecting and Restoring Missing or Corrupted Data in a Distributed, Scalable, Redundant Measurement Platform Database" U.S. Ser. No. 60/758,623, filed Jan. 13, 2006; the disclosure of which is incorporated herein by reference in its entirety.

TECHNICAL FIELD

The subject matter described herein relates to database error detection and correction. More particularly, the subject matter described herein relates to methods, systems, and computer program products for detecting and restoring missing or corrupted data in a distributed, scalable, redundant measurement platform database.

BACKGROUND

Telecommunication systems record and maintain operational parameters for billing, performance monitoring, and other related purposes. These operational parameters are often referred to as peg counts. Peg counts typically record the number of times that certain events within the system occur for an interval of time referenced by the peg count. For example, among other values, peg counts are recorded and maintained to indicate the number of messages processed system wide, the number of messages per link, and the number of messages per link set. In some systems, historical peg count data is often maintained for up to seven days in memory, resulting in a large volume of data that must be stored.

Hard disk drives are typically not used for storage of these peg counts and data is often stored in persistent memory. Persistent memory may maintain data through reset cycles for a piece of hardware, but will not preserve data through a power cycle beyond its design duration for power-fault tolerance. The design duration for power-fault tolerance will typically be very short and is typically achieved by use of bulk energy storage capacitors. Persistent memory may preserve data as long as the energy stored in the capacitors can maintain a voltage level at the memory sufficient for the retention of data. When the energy store in the capacitors is depleted to a point that the capacitors cannot maintain the voltage level necessary for the retention of data, the persistent memory will lose its data.

In conventional systems, a single operations, administration, and maintenance (OAM) module with a single persistent memory performs the task of collecting, maintaining and reporting peg counts. The OAM module also handles report generation and distribution to client servers. Based upon the potential for data loss, this single point of failure for peg count collection and storage may no longer be desirable.

Accordingly, in light of these difficulties associated with conventional peg count collection, maintenance and reporting systems, there exists a need for improved methods, systems, and computer program products for detecting and restoring missing or corrupted data in a distributed, scalable, redundant measurement platform database.

SUMMARY

According to one aspect, the subject matter described herein comprises methods, systems, and computer program products for detecting and restoring missing or corrupted data in a distributed, scalable, redundant measurement platform database. One method includes auditing a local database including a plurality of local database entries to identify suspect local database entries having at least one of missing and corrupted data. The method includes cross-comparing the local database with a redundant remote database that is a peer of the local database and that includes a plurality of redundant remote database entries that are associated with the plurality of local database entries, to identify local database entries that are inconsistent with the redundant remote database entries. The method includes, for each local database entry identified as suspect and inconsistent with the corresponding redundant remote database entry, replacing the local database entry with the redundant remote database entry.

Unlike a conventional master/slave distributed database arrangement, where one of the distributed databases holds a golden copy and the other distributed databases synchronize to the golden database, the methods, systems, and computer program products described herein operate in a peer mode without a golden database. Each peer database may improve its local copy of a distributed redundant database by replacing any local entries determined to be suspect and inconsistent with entries from one of its peers. Accordingly, the distributed redundant database may be improved overtime by peer-to-peer interaction and without use of a golden database.

The subject matter described herein providing for detecting and restoring missing or corrupted data in a distributed, scalable, redundant measurement platform database may be implemented using a computer program product comprising computer executable instructions embodied in a computer-readable medium. Exemplary computer-readable media suitable for implementing the subject matter described herein include chip memory devices, disk memory devices, programmable logic devices, and application specific integrated circuits. In addition, a computer-readable medium that implements the subject matter described herein may be distributed across multiple physical devices and/or computing platforms.

BRIEF DESCRIPTION OF THE DRAWINGS

Preferred embodiments of the subject matter described herein will now be explained with reference to the accompanying drawings of which.

DETAILED DESCRIPTION

In view of the problems described above with respect to conventional peg count collection, maintenance, and reporting, the subject matter described herein provides methods, systems, and computer program products for detecting and restoring missing or corrupted data in a distributed, scalable, redundant measurement platform database. Where previously an OAM module was responsible for collection, maintenance, and reporting of peg counts, the methods, systems, and computer program products described herein distribute the collection, maintenance, and reporting responsibilities to a distributed, scalable, and redundant measurement platform. The OAM retains responsibility for configuring the measurement platform and provides an interface for on-demand report generation by the measurement platform. By adapting the collection and maintenance functions to utilize a redundant mechanism, better fault tolerance may be achieved.

Figure 1:
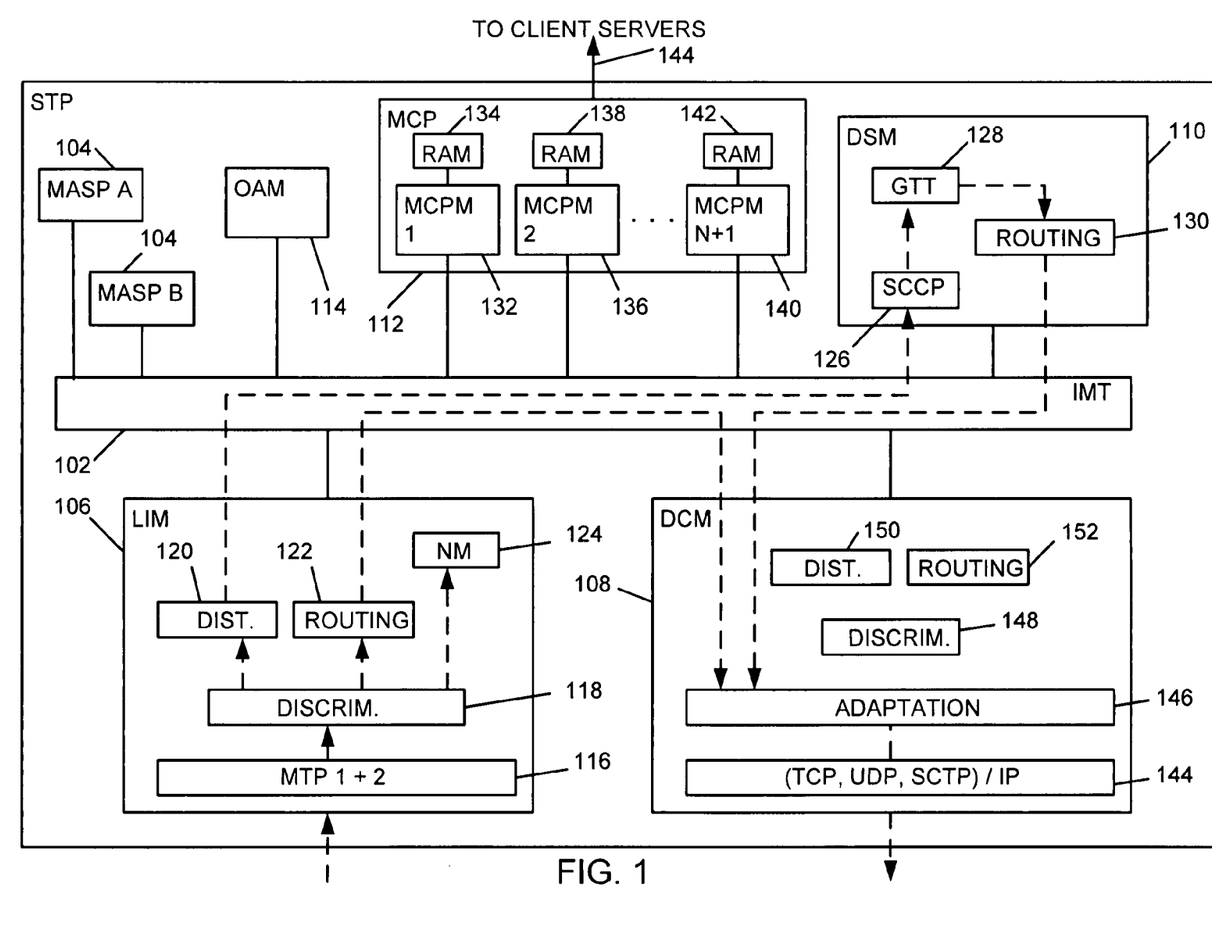
FIG. 1 is a block diagram of an exemplary signaling transfer point (STP) routing node including a measurement platform for the distributed, scalable, and redundant collection, maintenance, and reporting of peg counts according to an embodiment of the subject matter described herein.

FIG. 1 illustrates an exemplary signaling transfer point (STP) routing node 100 including a measurement platform for the distributed, scalable, and redundant collection, maintenance, and reporting of peg counts. In FIG. 1, STP 100 includes a high speed inter-processor message transport (IMT) communications bus 102. A number of distributed processing modules or cards may be coupled to IMT bus 102. In FIG. 1, these processing modules or cards include a pair of maintenance and administration subsystem processors 104, an SS7 link interface module (LIM) 106, an IP-capable data communication module (DCM) 108, a database services module (DSM) 110, a measurement collection platform (MCP) 112, and an OAM module 114. These modules may be physically connected to the IMT bus 102 such that signaling and other types of messages may be routed internally between active cards or modules. The distributed, multi-processor architecture of STP 100 facilitates the deployment of multiple LIM, DSM and other cards, all of which may be simultaneously connected to and communicating via IMT bus 102.

MASP pair 104 implement maintenance and administration subsystem functions. MASP pair 104 are not particularly relevant to a discussion of the collection, maintenance, and reporting of peg counts as described herein. Accordingly, a detailed discussion of their function is not provided herein.

LIM 106 interfaces with one or more external signaling links. LIM 106 may have a number of sub-components. In FIG. 1, these sub-components include an SS7 MTP level 1 & 2 function 116, an SS7 MTP level 3 layer message discrimination function 118, message distribution function 120, a routing function 122, and a signaling network management (NM) function 124. LIM 106 may generate peg counts on, for example, the number of messages that are processed by LIM 106 and that satisfy criteria defined for the peg counts. For example, LIM 106 may generate peg counts for each link connected to LIM 106. LIM 106 may initially store the peg counts that it generates in memory local to LIM 106.

Message transfer part (MTP) level 1 and 2 function 116 provides the facilities necessary to send and receive digital data over a particular physical medium, as well as to provide error detection, error correction and sequenced delivery of SS7 messages. Message discrimination function 118 receives signaling messages from the lower processing layers and performs a discrimination function that effectively determines whether an incoming SS7 message requires internal processing or is simply to be through switched. Examples of received SS7 messages that require internal processing include signaling connection control part (SCCP) messages in need of global title translation and signaling network management messages.

For SCCP messages that require global title translation (GTT) processing by DSM 110, message distribution function 120 may receive such messages from discrimination function 118 and direct the messages to DSM 110 via IMT bus 102. This type of internal distribution of messages within the STP node should not be confused with message routing, which refers to selecting an external signaling link over which a received message should be forwarded.

Routing function 122 is responsible for examining an incoming message and determining on which outbound linkset and link the message is to be transmitted. An MTP level 3 signaling network management (NM) function 124 may receive, process, and generate messages associated with the management and administration of an SS7 signaling network.

As illustrated in FIG. 1, DSM 110 includes an SCCP function 126. SCCP function 126 may provide end-to-end routing for transaction capabilities application part (TCAP) messages to their proper databases. SCCP function 126 may provide connection-oriented and connectionless services above MTP level 3 in the protocol stack. SCCP function 126 may provide a transport layer for such services as, for example, toll-free calling (e.g., 800/866/888 numbers), calling card transactions, roaming for wireless phones, and local number portability (LNP). SCCP function 126 may generate peg counts on, for example, the number of messages that are processed by DSM 110 and that satisfy criteria defined for the peg counts. For example, DSM 110 may generate peg counts for messages requiring GTT. DSM 110 may initially store the peg counts that it generates in memory local to DSM 110.

SCCP function 126 may also provide an interface to a GTT function 128 for performing GTT related operations. GTT function 128 may be used by SCCP function 126 to translate digits present in a signaling message (e.g., an 800 number) to destination point codes (DPCs) and subsystem numbers (SSNs) to allow routing of these messages to the final destination.

A routing function 130 may perform the same routing functions as those described above with respect to routing function 122. When performing route selection for a message that has undergone GT translation processing, routing function 130 may examine message origination information contained in a GT translated message.

DCM 108 includes an IP transport function 144, a signaling protocol adaptation function 146, a discrimination function 148, a distribution function 150, and a routing function 152. DCM 108 may generate peg counts on, for example, the number of messages that are processed by DCM 108.

IP transport function 144 includes hardware and software for implementing OSI layers 1-3. For example, IP transport function may implement a physical layer protocol, such as Ethernet, a network layer protocol, such as IP, and a transport layer protocol, such as transmission control protocol (TCP), user datagram protocol (UDP), and/or stream control transmission protocol (SCTP). Adaptation function 146 may receive a signaling message from an IP network that is formatted according to a first signaling protocol (e.g., M3UA, SUA, M2PA, TALI or other IP adaptation layer protocol), and adapt or reformat the message into a second signaling protocol (e.g., MTP). Adaptation function 146 may also receive a signaling message, such as a signaling initiation protocol (SIP) message, and translate the SIP message into an equivalent SS7 or SS7-adaptation protocol message, and vice-versa. These adaptation and translation processing operations may be performed on in-bound and out-bound signaling messages. Adaptation function 146 may also receive outbound SS7 messages from other modules in STP 100 and modify the messages for transport over the IP network according to the appropriate signaling transport or other IP adaptation layer protocol.

Discrimination function 148 performs discrimination operations similar to those described above with respect to discrimination function 118, and as such discrimination function 148 may provide STP 100 with a network firewall. In addition to the SS7 and SS7-adaptation protocol discrimination parameters described above, discrimination function 148 may also examine received SIP message parameters including a To parameter, a From parameter, a Via parameter, a source IP address parameter, a destination IP address parameter, and others. Discrimination based on these parameters enables discrimination function 148 to determine whether screening or internal processing is required. According to one embodiment, discrimination function 148 may copy a received signaling message, such that the original message may be routed to the target destination and the message copy may be processed by one or more processing subsystems associated with STP 100.

Distribution function 150 handles the internal routing of message packets that require additional processing prior to final routing. Such messages may include signaling messages associated with message service messages such as SMS, MMS, and IM services (e.g., SIP INFO message, SIP MESSAGE message, SIP INVITE message, etc.), as well as mobility management messages. Routing function 152 is adapted to access network routing rule information, which may include SS7 and IP network routing rules, and apply these routing rules to messages that require routing. DCM 108 may generate peg counts based on messages it processes. For example, DCM 108 may maintain peg counts for each IP link to which DCM 108 is connected.

MCP 112 may collect peg counts from LIM 106, DCM 108, and DSM 110. In the illustrated example, MCP 112 includes a set of N+1 measurement collection processor modules (MCPMs) and associated random access memories (RAMs), MCPM_1 132 and RAM 134, MCPM_2 136 and RAM 138, and MCPM_N+1 140 and RAM 142, respectively. The number N is the number of MCPMs chosen to collect, maintain, and report peg counts within the system, plus one "spare" MCPM. The spare MCPM may either load-share with the remaining MCPMs or may be a hot standby unit capable of being switched into service in the event of a unit failure. As will be described in more detail below, MCPMs 132, 136, and 140 may operate in a primary/secondary (or multi-secondary) configuration or may operate in a load-share configuration.

Initially, OAM 114 may perform all of the OAM functions of conventional systems described above. In addition to conventional functionality, OAM 114 may provision and test MCP 112 prior to transferring measurements functionality from OAM 114 to MCP 112. When MCP 112 hardware, software, and Ethernet connections have been provisioned and verified, the transfer of measurements functionality from OAM 114 to MCP 112 may be initiated by setting a "Measurements Platform Installed" bit in a system control register. Arrow 144 represents an Ethernet file transfer protocol (FTP) interface to client servers over which reporting of measurement information may be performed. Once MCP 112 is activated, all collection, measurement, and reporting functionality previously associated with conventional OAM devices, is transferred to MCP 112. OAM 114 may still provide an operator interface for measurement configuration and on-demand report requests. On-demand report requests may be forwarded to and fulfilled by MCP 112. Measurement configuration may be handled much like initial provisioning of MCP 112.

MCP 112 may store measurement data collected from LIM 106, DCM 108, and DSM 110 in distributed MCPM RAM devices. For example, RAM 134, RAM 138, and RAM 142 may be used to store collected measurement data in a distributed fashion. The particular RAM device used for initial storage of collected measurement data may vary depending upon the chosen configuration for MCP 112, as will be described in more detail below.

The collection of measurement data may include issuing a query for peg counts from a collecting MCPM device, such as for example, MCPM_1 132, to each of LIM 106, DCM 108, and DSM 110. In response to the query for peg counts, each device may respond with peg counts. MCPM_1 132 may receive the peg counts and may store them in RAM 134. Following collection, a sync process, as will be described below, may operate to synchronize the remaining MCPM devices for redundant data collection purposes.

It should be noted that querying may be performed by any MPCM device acting in a primary capacity for the respective collection points. As will be described in more detail below, many configuration possibilities exist for the MCPM devices within MCP 112. Accordingly, the queries issued and the associated range of collection points collected by a given MCPM device may vary depending upon the configuration.

Regarding report generation, scheduled reports may be automatically generated by MCP 112 and transferred to the client's FTP server via the Ethernet FTP interface. On demand report requests may be generated by MCP 112 and transferred to the client's FTP server or output to a client terminal.

As indicated above, a variety of configuration possibilities exist for MCP 112. For example, MCP 112 may be configured into a primary/secondary (or multi-secondary) configuration with one MCPM as the primary MCPM and the other MCPMs as secondary MCPMs. MCP 112 may also be configured into a load-share configuration where each active MCPM is configured to manage a percentage of the overall collection, maintenance, and reporting responsibility for MCP 112. In addition to each basic mode described, each configuration may be complemented with a spare MCPM in either a hot-standby or load-share mode. Each configuration option will be described in more detail below.

When MCP 112 is configured in a primary/secondary mode, the MCPM module with the lower IMT bus 102 address may be chosen as the primary module and the others designated as secondary modules. For example, if MCPM_1 132 has the lowest IMT bus 102 address, MCPM_1 132 may be chosen as the primary MCPM module and the other MCPMs may be secondary modules. Other methods of selecting the primary card are possible and all are considered the scope of the subject matter described herein. For example, the MCPM module with the highest IMT bus 102 address may be chosen as the primary module or a round-robin alternating primary scheme may be used.

In such a primary/secondary configuration, MCPM_1 132 may perform all measurement collection and reporting functions and provide storage for collection data and scheduled reports in RAM 134. A secondary MCPM, for example MCPM_2 136, may provide a redundant backup for MCPM_1 132 and may assume collection and reporting responsibilities on the loss of the MCPM_1 132. As described above, MCPM_N+1 140 may perform as another redundant secondary to provide increased fault tolerance. An FTP client may be configured on primary MCPM_1 132 to support the transfer of reports to a client's FTP server. The FTP configuration may be customized to support automatic transfer of scheduled reports from the primary MCPM_1 132 to the client's server.

When MCP 112 is configured in a load-sharing mode, the MCPM modules may be configured to distribute the collection and maintenance load between them to improve the timeliness of collection of measurement data in larger systems. For example, for a given load, with MCP 112 configured with two MCPM modules, MCPM_1 132 and MCPM_2 136, each may collect data for fifty percent of the load. Other methods of allocating the load are possible and all are considered the scope of the subject matter described herein. For example, the load may be distributed with a pseudo-primary/secondary type of relationship where one of the MCPM modules, such as MCPM_1 132, may initially be considered a primary load-share MCPM and carry sixty percent of the load, with MCPM_2 136 carrying forty percent of the load. This disproportionate load distribution may also be transitioned from MCPM_1 132 to MCPM_2 136 periodically and to other MCPM modules in a round-robin fashion.

In such a load-share configuration, one MCPM module, such as MCPM_1 132, may be chosen to perform all reporting functions for MCP 112 or each MCPM may be responsible for reporting its collected data. Storage for collection data in a load-share configuration may be distributed as well. For example, in an equal load share distribution, RAM 134 and RAM 138 may each store collection data for the collection points allocated to MCPM_1 132 and MCPM_2 136, respectively.

In any such load-share configuration, the MCPM modules that are not associated with a given set of collection points may provide a redundant backup for the collecting MCPM. In this way, each MCPM module may perform as a secondary backup to each of the other MCPM modules. For example, for collection points and associated data collected by MCPM_1 132 and stored initially in RAM 134, MCPM_2 136 may provide a secondary backup function for those collection points by storing the collection data for those collection points in its RAM 138. This distributed redundancy mechanism for detection and restoration of corrupt or missing data will be described in more detail below.

As described above, MCPM_N+1 140 may perform as another redundant load share device to further distribute the load and to provide increased fault tolerance. An FTP client may be configured on each MCPM module to support the transfer of reports to a client's FTP server or a single MCPM card, such as MCPM_1 132, may be chosen to handle the reporting function. The FTP configuration may be customized to support automatic transfer of scheduled reports from any reporting MCPM to the client's server.

A load-share configuration may be used to provide for system growth by providing increased processor bandwidth and scalability over time. MCPM modules may be added or removed as collection and reporting loads increase or decrease, respectively, with a coordinated re-distribution of the load to all active MCPM modules.

With an understanding of the distributed, scalable, and redundant collection, maintenance, and reporting architecture of STP routing node 100 described above, a methodology by which missing or corrupted data may be detected and restored in such a distributed, scalable, and redundant measurement system will now be described.

Figure 2:
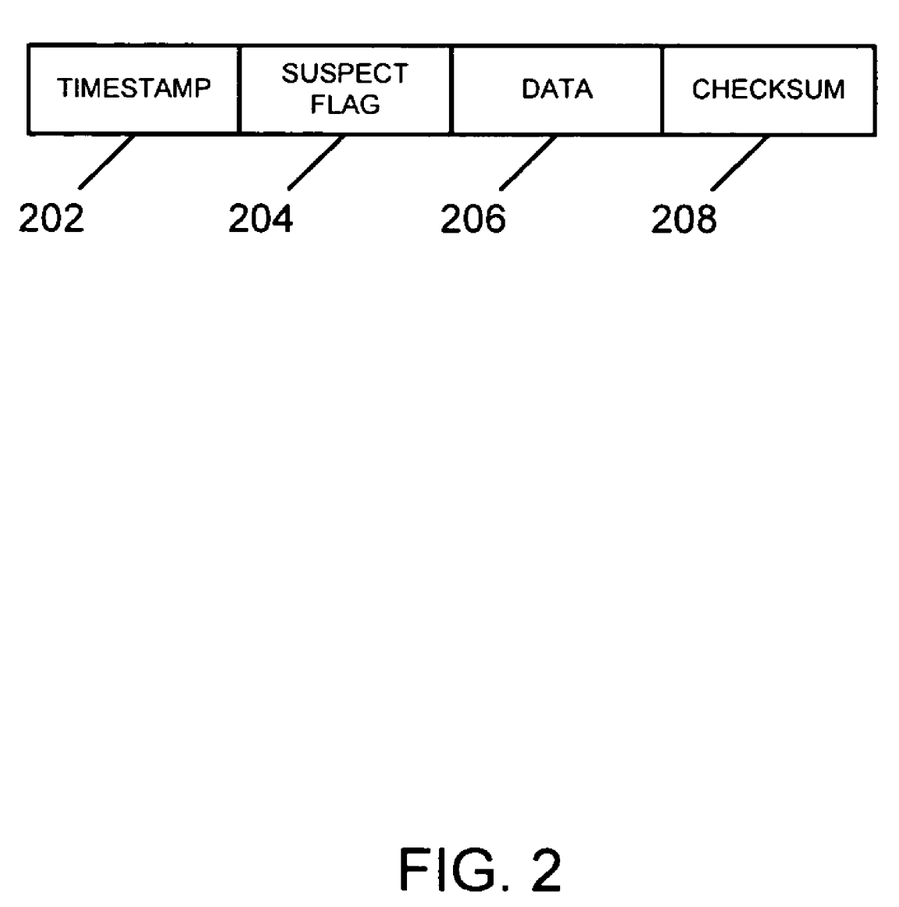
FIG. 2 is a block diagram of a redundant database entry, illustrating exemplary data fields, that may be organized as a table and used within a distributed, scalable, and redundant collection, maintenance, and reporting system for the detection and restoration of missing or corrupted data according to an embodiment of the subject matter described herein.

FIG. 2 illustrates an exemplary distributed, scalable, and redundant database entry 200 that may be, for example, organized as a table and used within a distributed, scalable, and redundant collection, maintenance, and reporting system, such as STP routing node 100, for the detection and restoration of missing or corrupted data. The table of redundant database entries 200 may be created and stored within an MCPM RAM, such as for example, RAM 134. Timestamp field 202 may include a timestamp indicator associated with database entry 200. Timestamp field 202 may include any format for a timestamp indicator that provides a relative measure of time for the database entry 200 to indicate when the timestamp indicator was created. For example, timestamp field 202 may include output from a real-time clock module or from a system time clock in any useable format.

Suspect flag field 204 may include an indicator to indicate that the data contained in data field 206 may be corrupt or expired. As will be described in more detail below, data field 206 may become corrupt or expired for a variety of reasons. Suspect flag field 204 may be used to indicate that database entry 200 may need restoration of missing or corrupted data.

Checksum field 208 may include an entry associated with data field 206 that may be used to verify that data within data field 206 has not become corrupted. Any type of checksum may be used within checksum field 208. For example, an eight, sixteen, thirty two, sixty four, or larger bit value may be used. As well, checksum field 208 may be a negated-additive value of the data within data field 206 or a cyclical redundancy check (CRC) of the data within data field 206. Alternatively, checksum field 208 may be associated with all fields within a redundant database entry 200. For example, checksum field 208 may operate over timestamp field 202, suspect flag field 204, and data field 206. Many other forms of error checking and correction are possible and all are considered within the scope of the subject matter described herein.

Figure 3:
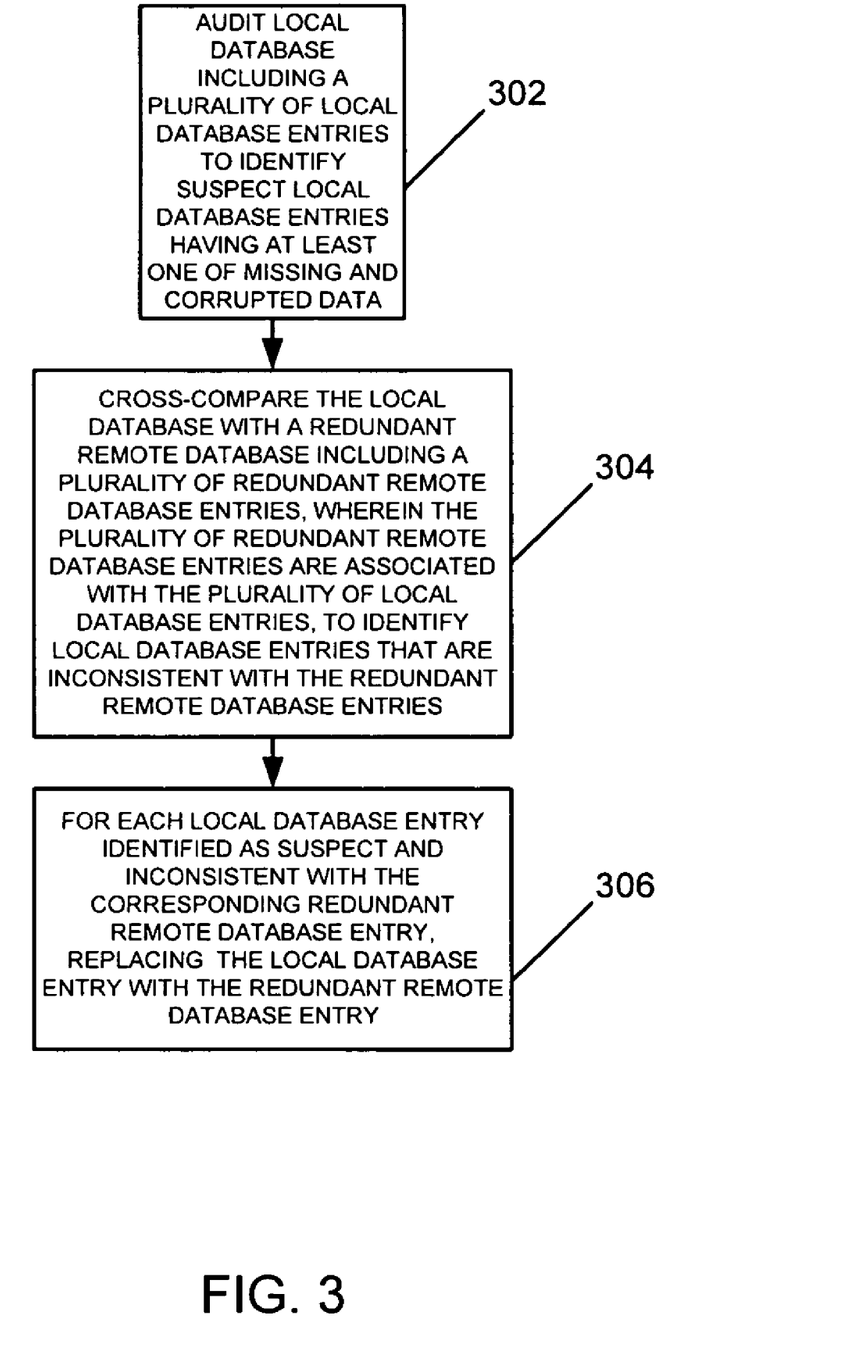
FIG. 3 is a flow chart illustrating a distributed, scalable, and redundant collection, maintenance, and reporting process by which missing or corrupted data may be redundantly detected and restored according to an embodiment of the subject matter described herein.

FIG. 3 illustrates an exemplary distributed, scalable, and redundant collection, maintenance, and reporting process 300 by which missing or corrupted data may be redundantly detected and restored. At block 302, process 300 may audit a local database including a plurality of local database entries to identify suspect local database entries having at least one of missing and corrupted data. For example, exemplary distributed, scalable, and redundant collection, maintenance, and reporting process 300 may be executed on any of MCPM_1 132, MCPM_2 136, and MCPM_N+1 140, each with a local database stored in random access memories 134, 138, and 142, respectively.

At block 304, process 300 may cross-compare the local database with a redundant remote database including a plurality of redundant remote database entries, wherein the plurality of redundant remote database entries are associated with the plurality of local database entries, to identify local database entries that are inconsistent with the redundant remote database entries. For example, MCPM_1 132 may cross-compare with MCPM_2 136 and/or MCPM_N+1 140, where the local databases of MCPM_2 136 or MCPM_N+1 140, stored in random access memories 138, and 142, respectively, are redundant remote databases to MCPM_1 132.

At block 306, for each local database entry identified as suspect and inconsistent with the corresponding redundant remote database entry, process 300 may replace the local database entry with the redundant remote database entry. For example, MCPM_1 132 may request redundant remote database entries to replace the identified local database entries that are inconsistent and that are also identified suspect local database entries from the redundant remote database of MCPM_2 136 and/or MCPM_N+1 140, and when received, MCPM_1 132 may copy the requested redundant remote database entries to the local database stored in random access memory 134.

Figure 4:
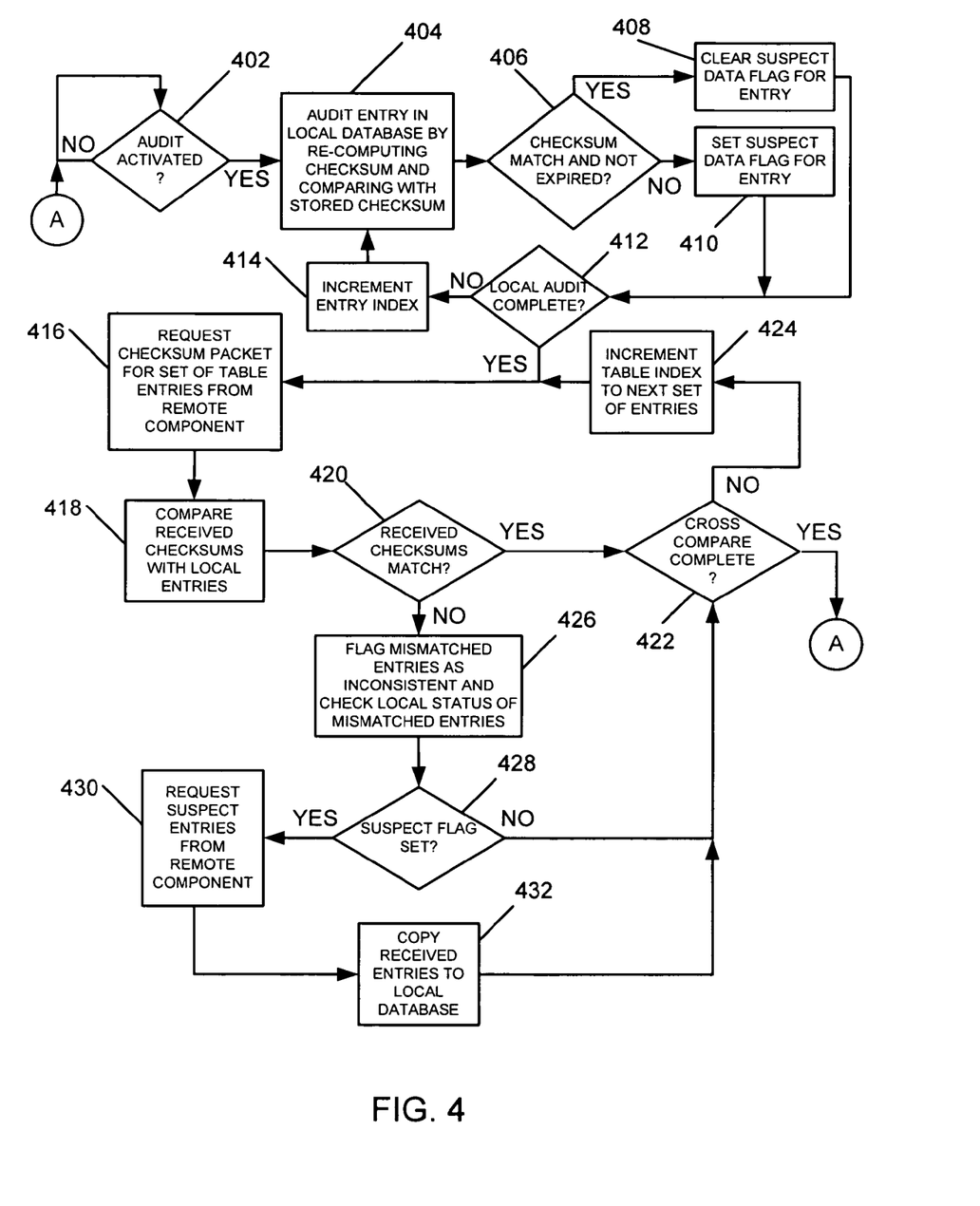
FIG. 4 is a flow chart illustrating a distributed, scalable, and redundant collection, maintenance, and reporting process by which missing or corrupted data may be redundantly detected and restored using an iterative audit and an iterative cross-comparison between databases according to an embodiment of the subject matter described herein.

FIG. 4 illustrates an exemplary distributed, scalable, and redundant collection, maintenance, and reporting process 400 by which missing or corrupted data may be detected and restored using an iterative audit and an iterative cross-comparison between redundant databases. Distributed, scalable, and redundant collection, maintenance, and reporting process 400 may perform detection and correction of missing or corrupted data by auditing a local set of database entries, and then cross-comparing the local entries with a remote redundant database and requesting entries that are mismatched, as will be described in more detail below, in order to provide mechanisms for detection and correction of missing or corrupted redundant data.

Entries within a database may be considered corrupt when, for example, a checksum associated with the entry does not match. As well, when multiple modules share data to create a redundant database and each module has a local copy of the database, entries may become corrupted, for example, during a reboot cycle of one module. The module may experience the reboot cycle during an update sequence for a database entry or during an audit cross-compare process by which entries are synchronized between the modules. In either case, the reboot cycle may result in corrupted data for one or more entries within a database.

Entries within a database may be considered missing, for example, when they either are not physically present or when a timestamp associated with the entry is older than a threshold timeframe resulting in an expired entry within the database. The threshold timeframe that may be used to constitute an expired entry may be, for example, five minutes. Entries may be missed or become expired, for example, when a module reboots during a data collection event. If an entry is missed during the reboot cycle, the entry will be missing. If an older entry is in the place of the entry that was missed, it may eventually expire.

Distributed, scalable, and redundant collection, maintenance, and reporting process 400 may recognize and correct these types of data events, as will be described below. At decision point 402, process 400 may wait for an audit to be activated. An audit may be activated for all or for a portion of the local database. For example, when configured in a primary/secondary mode, secondary MCPMs may audit the entire local database to synchronize with the primary MCPM. As well, primary MCPMs may audit the entire local database and synchronize with a secondary MCPM. Further, secondary MCPMs may audit the entire local database and synchronize with one another. In this way, all MCPMs may run process 400 to synchronize the local database with the other MCPM modules and, thereby, provide for any MCPM module to become the primary module at any point in time. As another example, when configured in a load-sharing mode, an MCPM, such as for example MCPM_1 132, may act as a primary for certain table entries and as a secondary redundant backup for certain other table entries. MCPM_1 132 may either audit all table entries or it may audit only those entries for which it is acting as a secondary redundant backup. When all table entries are audited, an audit may begin at any table entry within the database, such as for example, the lowest entry index within the database. When only auditing table entries for which an MCPM is a secondary redundant backup, an audit may begin at the start of or within any area of the database that is associated with the secondary redundant backup capacity. It may also be desirable to audit all entries to manage situations, such as a primary reboot, for example, for either the primary/secondary or for the load-sharing mode.

At block 404, process 400 may begin an audit of the local database by auditing an entry in the local database. This audit may begin at any entry within the database, as described above, and may begin by re-computing a checksum and comparing the re-computed checksum with a stored checksum associated with the audited entry. A timestamp for the local entry may also be examined to determine whether the entry has expired.

At decision point 406, process 400 may determine whether the re-computed checksum matches the stored checksum and may determine whether the local entry has expired. An entry may be considered expired when the timestamp field 202 associated with the entry is older than a chosen threshold, again, for example, five minutes. When a timestamp field 202 associated with the entry is older than the chosen threshold, the data within data field 206 may be considered missing. Missing data may be the result of a power or reboot cycle, as described above, wherein a module, such as, for example, MCPM_1 132, missed a measurement event or series of events for a given measured entity. When the checksum matches and the local entry has not expired, process 400 may clear a suspect data flag associated with the entry at block 408. When either the checksum does not match or when the entry has expired, process 400 may set the suspect data flag associated with the entry at block 410.

At decision point 412, a determination may be made as to whether the local audit is complete. If the local audit is not complete, an entry index may be incremented at block 414 and audit of the next entry may begin at block 404. The entry index may operate in a modulo fashion with respect to the size of the local database or a region of the audit so that the entry index may wrap to the beginning of the audit region when the end of the audit region is reached. The modulo operation of the indexing may allowing the audit process to begin at a point other than the lowest entry index when, for example, one region of the local database is more critical than another region with a lower index.

Process 400 may iterate until all local entries have been audited, as determined at decision point 412, and then may begin a cross-comparison with a redundant remote component by requesting a checksum packet for a set of table entries from the remote component at block 416. The size of the set of table entries requested may be determined by the packet payload size used to request the checksum entries divided by the checksum size. When the checksum packet is received for the set of table entries, process 400 may compare the received checksums with the local entries associated with the set requested at block 418. At decision point 420, a decision may be made as to whether the received checksums match the checksums associated with the local database entries. When the checksums do all match, process 400 may determine whether the cross-comparison is complete at decision point 422 and, when not complete, may increment a table index to a next set of table entries at block 424. Process 400 may iterate to request a checksum packet for the next set of table entries at block 416. When the cross-comparison is complete, as determined at decision point 422, process 400 may return to decision point 402 to await the beginning of a new local database audit.

As with the entry index described above, the table index may operate in a modulo fashion to allow certain regions of the local database to be prioritized. Further, process 400 may skip regions of table entries under certain circumstances, such as, for example, in a load-sharing configuration, as described above.

When a checksum mismatch is found for any entry, as determined at decision point 420, the entry may be identified as inconsistent and the status of the table entries may be checked at block 426. At decision point 428, a determination may be made as to whether the suspect flag has been set for any entry identified as inconsistent in the set of table entries. If the suspect flag has been set for any of the inconsistent table entries, the suspect and inconsistent entries may be requested from the remote component at block 430. When the requested entries have been received, they may be written to the local database at block 432.

Process 400 may then determine, as described above, whether the cross-comparison is complete at decision point 422. Process 400 may also determine whether the cross-comparison is complete at decision point 422 when it determines, at decision point 428, that no suspect data flags are set for any of the inconsistent local database table entries. When there are no suspect data flags set for any of the inconsistent local database table entries, process 400 may determine that the remote component has a corrupt set of data and that the local database table entries are valid relative to those of the remote component as could be evidenced by the mismatch of the checksums between the two databases. In this case, entries do not need to be requested from the remote component and the remote component may request entries from the local database when the remote component performs an audit.

When, as described above, a determination is made at decision point 422 that the cross-comparison is not complete, the table index may again be incremented at block 424 and process 400 may iterate through the remainder of the table entries. As also described above, when the cross-comparison is complete, as determined at decision point 422, process 400 may return to decision point 402 to await the beginning of a new local database audit.

Distributed, scalable, and redundant collection, maintenance, and reporting process 400 may run on each MCPM 132, 136, and 140 within MCP 112, thereby allowing distributed, scalable, and redundant collection, maintenance, and reporting of measurement data across MCP 112 and to allow the detection and correction of missing or corrupted data by auditing a local set of database entries on each MCPM, cross-comparing the local entries between the MCPMs, and requesting entries that are mismatched from the cross-compared MCPM.

As described above, MCPMs 132, 136, and 140 within MCP 112 may be configured in either a primary/secondary relationship or in a load sharing relationship. Accordingly, when configured in a primary/secondary arrangement, one MCPM module, for example, MCPM 132 may be designated as primary and the remaining MCPMs, for example MCPM 136 and MCPM 140, designated as secondary. In such a configuration, the MCPMs designated secondary may run a process, such as distributed, scalable, and redundant collection, maintenance, and reporting process 400, to synchronize their local databases with the primary MCPM 132 to provide redundancy and to improve accuracy.

Alternatively, when configured in a load-sharing arrangement, each MCPM 132, 136, and 140 within MCP 112 may be responsible for collection, maintenance, and reporting of certain table entries. In such a configuration, each MCPM may run a process, such as distributed, scalable, and redundant collection, maintenance, and reporting process 400, to synchronize table entries that it is not responsible for collecting, maintaining, and reporting from the remote MCPMs within MCP 112. As described above, each MCPM may initiate distributed, scalable, and redundant collection, maintenance, and reporting process 400 to begin at any location within its database and to exclude synchronization of portions for which each has primary collection, maintenance, and reporting responsibility. After a reboot cycle, for example, each MCPM may request data for portions of the table entries for which it does have primary collection, maintenance, and reporting responsibility, thereby utilizing the redundancy mechanism to allow each MCPM to refresh its data after the reboot cycle. As well, when in the load-sharing arrangement, as described above, the remaining MCPMs may pick up the load from an MCPM that is taken off line for maintenance or that reboots. In such a situation, the MCPM that is coming back on line or that is rebooting may acquire the latest database information from the MCPMs that managed the load during the maintenance or reboot cycle.

Although the examples described above relate to database synchronization and verification for peg count measurements collected by an integrated measurement platform at an STP, the subject matter described herein is not limited to database synchronization and verification for peg count measurements by an integrated measurement platform at an STP. The methods and systems described herein can be used to synchronize and verify data at any distributed database platform where copies of the same data exist in different locations. For example, in the telecommunications industry, the methods and systems described herein can be used to synchronize and verify data at an integrated or a stand-alone measurements platform associated with any telecommunications node, such as a service switching point (SSP), a service control point (SCP), a media gateway controller (MGC), a session initiation protocol (SIP) server, etc. An example of a stand-alone measurements platform on which the subject matter described herein may be implemented includes any probe-based network data collection system, such as those available from Agilent, Tekelec, Inet, or other telecommunications measurement equipment vendor.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A computer implemented method for detecting and restoring missing or corrupted data in a distributed, scalable, redundant measurement platform database, the method comprising:

at each of a plurality of interface modules in a routing node, generating peg counts, which are counts of signaling messages received by the routing node that satisfy predetermined criteria;

distributing the peg counts generated by the interface modules across a plurality of databases in the routing node, wherein the plurality of databases includes a local database and a redundant remote database, wherein the redundant remote database is stored in a memory that is separate from a memory that stores the local database and wherein the redundant remote database is managed by a measurement collection processor module (MCPM) that is separate from an MCPM that manages the local database;

using the MCPM that manages the local database by:
auditing the local database including a plurality of local database entries to identify suspect local database entries having at least one of a missing or corrupted peg count;

cross-comparing the local database with the redundant remote database that is a peer of the local database and that includes a plurality of redundant remote database entries, wherein the plurality of redundant remote database entries is associated with the plurality of local database entries, to identify local database entries that are suspect and inconsistent with the redundant remote database entries, wherein the local and remote database entries store peg counts; and for each local database entry identified as suspect and inconsistent with the corresponding redundant remote database entry, replacing the local database entry with the redundant remote database entry.

2. The computer implemented method of claim 1 wherein auditing the local database includes calculating a checksum for each of the plurality of local database entries.

3. The computer implemented method of claim 1 wherein auditing the local database includes calculating a cyclical redundancy check (CRC) for each of the plurality of local database entries.

4. The computer implemented method of claim 1 wherein auditing the local database comprises setting a suspect data indicator for each identified suspect local database entry.

5. The computer implemented method of claim 4 wherein setting the suspect data indicator includes setting the suspect data indicator based upon a checksum failure for each identified suspect local database entry.

6. The computer implemented method of claim 4 wherein setting the suspect data indicator includes setting the suspect data indicator based upon an expired timestamp indicator for each identified suspect local database entry.

7. The computer implemented method of claim 1 wherein cross-comparing includes requesting a plurality of checksums for the redundant remote database entries from the redundant remote database.

8. The computer implemented method of claim 7 wherein, in response to receiving the requested plurality of checksums, cross-comparing includes comparing the received plurality of checksums with checksums associated with the plurality of local database entries to identify local database entries that are inconsistent with the redundant remote database entries.

9. The computer implemented method of claim 1 wherein replacing the local database entry with the redundant remote database entry includes requesting the redundant remote database entry from the redundant remote database and, in response to receiving the redundant remote database entry, copying the redundant remote database entry to the local database to replace the local database entry.

10. The computer implemented method of claim 1 comprising operating the local database in a secondary capacity for collection, measurement and reporting and operating the redundant remote database operates in a primary capacity for collection, measurement and reporting for a distributed, scalable, redundant measurement platform.

11. The computer implemented method of claim 1 comprising operating the local database and the redundant remote database in a load sharing capacity and operating the local database in a secondary capacity for collection, measurement and reporting for a portion of the distributed, scalable, redundant measurement platform and operating the redundant remote database in a primary capacity for collection, measurement and reporting for the portion of the distributed, scalable, redundant measurement platform.

12. The computer implemented method of claim 1 wherein the local and redundant remote database entries contain telecommunications measurement data.

13. The computer implemented method of claim 1 wherein steps (a)-(c) are performed at a signaling transfer point (STP).

14. A system for detecting and restoring missing or corrupted data in a distributed, scalable, redundant measurement platform database, the system comprising:

a routing node for routing signaling messages, the routing node including a plurality of interface modules for generating peg counts based on signaling messages received by the routing node that satisfy predetermined criteria;

the routing node including a measurement collection platform (MCP) configured to collect, maintain, and report operational parameters, to receive the peg counts from the interface modules, and to distribute the peg counts across a plurality of measurement collection processor modules (MCPMs) in the routing node; and wherein the plurality of measurement collection processor modules are controlled by the MCP, and wherein the plurality of MCPMs includes a local database storing the peg counts in a plurality of local database entries and a redundant remote database that includes a plurality of redundant remote database entries, wherein the redundant remote database is stored in a memory that is separate from a memory that stores the local database and wherein the redundant remote database is managed by an MCPM that is separate from the MCPM that manages the local database and wherein the MCPM that manages the local database is configured to:

audit the local database including a plurality of local database entries to identify suspect local database entries having at least one of a missing or corrupted peg count;

cross-compare the local database with at least one of the redundant remote databases that is a peer of the local database and that includes a plurality of redundant remote database entries, wherein the plurality of redundant remote database entries are associated with the plurality of local database entries, to identify local database entries that are inconsistent with the redundant remote database entries, wherein the local and remote database entries store peg counts; and for each local database entry identified as suspect and inconsistent with the corresponding redundant remote database entry, replace the local database entry with the redundant remote database entry.

15. The system of claim 14 wherein the MCPMs are configured to audit the local database by calculating a checksum for each of the plurality of local database entries.

16. The system of claim 14 wherein the MCPMs are configured to audit the local database by calculating a cyclical redundancy check (CRC) for each of the plurality of local database entries.

17. The system of claim 14 wherein the MCPM are configured to set a suspect data indicator for each identified suspect local database entry.

18. The system of claim 17 wherein the MCPM are configured to set the suspect data indicator based upon a checksum failure for each identified suspect local database entry.

19. The system of claim 17 wherein the MCPM are configured to set the suspect data indicator based upon an expired timestamp indicator for each identified suspect local database entry.

20. The system of claim 14 wherein the MCPMs are configured to cross-compare by requesting a plurality of checksums for the redundant remote database entries from the redundant remote database.

21. The system of claim 20 wherein the MCPMs are configured to cross-compare by comparing the received plurality of checksums with checksums associated with the plurality of local database entries to identify local database entries that are inconsistent with the redundant remote database entries.

22. The system of claim 14 wherein, in replacing the local database entry with the redundant remote database entry, the MCPMs are configured to request the redundant remote database entry from the redundant remote database and, in response to receiving the redundant remote database entry, copy the redundant remote database entry to the local database to replace the local database entry.

23. The system of claim 14 wherein the MCP is configured to operate at least one of the plurality of MCPMs in a primary capacity for collection, measurement and reporting and to operate the remainder of the MCPMs in a secondary capacity for collection, measurement and reporting.

24. The system of claim 14 wherein the MCP is configured to operate the plurality of MCPMs in a load sharing capacity wherein each of the plurality of MCPMs is assigned a portion of the collection, measurement and reporting of operational parameters for the MCP, and wherein each of the plurality of MCPMs operates the local database of the MCPM in a primary capacity for the portion of the collection, measurement and reporting of operational parameters assigned to the MCPM, and wherein each of the remainder of the plurality of MCPMs operates the local database of the MCPM in a secondary capacity for the portion of the collection, measurement and reporting of operational parameters assigned to each other remaining MCPMs of the plurality of MCPMs.

25. The system of claim 14 wherein the local and redundant remote database entries contain telecommunications measurement data.

26. The system of claim 14 wherein the MCP and the plurality of MCPMs are co-located with a signaling transfer point (STP).

27. A computer program product comprising computer-executable instructions embodied in a computer-readable medium for performing steps comprising:
   at each of a plurality of interface modules in a routing node, generating peg counts, which are counts of signaling messages received by the routing node that satisfy predetermined criteria;
   distributing the peg counts generated by the interface modules across a plurality of databases in the routing node, wherein the plurality of databases includes a local database and a redundant remote database, wherein the redundant remote database is stored in a memory that is separate from a memory that stores the local database and wherein the redundant remote database is managed by a measurement collection processor module (MCPM) that is separate from an MCPM that manages the local database;
   using the MCPM that manages the local database by:
      auditing the local database including a plurality of local database entries to identify suspect local database entries having at least one of a missing or corrupted peg count;
      cross-comparing the local database with the redundant remote database that is a peer of the local database and that includes a plurality of redundant remote database entries, wherein the plurality of redundant remote database entries is associated with the plurality of local database entries, to identify local database entries that are suspect and inconsistent with the redundant remote database entries, wherein the local and remote database entries store peg counts; and
      for each local database entry identified as suspect and inconsistent with the corresponding redundant remote database entry, replacing the local database entry with the redundant remote database entry.

* * * * *

UNITED STATES PATENT AND TRADEMARK OFFICE
CERTIFICATE OF CORRECTION

PATENT NO. : 7,650,367 B2  Page 1 of 1
APPLICATION NO. : 11/341135
DATED : January 19, 2010
INVENTOR(S) : Dwayne Arruza It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 309 days.

Signed and Sealed this

Twenty-third Day of November, 2010

David J. Kappos
*Director of the United States Patent and Trademark Office*